United States Patent
Savatsky et al.

(10) Patent No.: US 7,847,036 B2
(45) Date of Patent: Dec. 7, 2010

(54) METHOD FOR REDUCING AND/OR PREVENTING PRODUCTION OF EXCESSIVELY LOW DENSITY POLYMER PRODUCT DURING POLYMERIZATION TRANSITIONS

(75) Inventors: Bruce J. Savatsky, Kingwood, TX (US); Daniel P. Zilker, Jr., Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 12/519,484

(22) PCT Filed: Dec. 12, 2007

(86) PCT No.: PCT/US2007/025678

§ 371 (c)(1), (2), (4) Date: Feb. 19, 2010

(87) PCT Pub. No.: WO2008/076386

PCT Pub. Date: Jun. 26, 2008

(65) Prior Publication Data

US 2010/0144981 A1    Jun. 10, 2010

Related U.S. Application Data

(60) Provisional application No. 60/875,444, filed on Dec. 18, 2006.

(51) Int. Cl.
*C08F 2/34* (2006.01)
*C08F 210/16* (2006.01)

(52) U.S. Cl. ............... 526/59; 526/348.5; 526/901; 526/905

(58) Field of Classification Search ............. 526/59, 526/60, 348.5, 901, 905
See application file for complete search history.

(56) References Cited

U.S. PATENT DOCUMENTS

| | | | |
|---|---|---|---|
| 5,627,242 A | 5/1997 | Jacobsen et al. | |
| 6,242,545 B1 | 6/2001 | Jejelowo et al. | |
| 6,528,597 B2 | 3/2003 | Loveday et al. | |
| 6,649,710 B2 | 11/2003 | Morterol | 526/88 |
| 6,846,884 B2 | 1/2005 | Parrish et al. | |
| 2005/0020784 A1 | 1/2005 | Noll | |

(Continued)

FOREIGN PATENT DOCUMENTS

WO    WO 00/32651    6/2000

(Continued)

*Primary Examiner*—Fred M Teskin (57) ABSTRACT

A method for controlling a transition from an initial polymerization reaction to a target polymerization reaction in a manner that reduces significantly the amount of off-grade product having excessively low density produced during the transition, including steps of: during the transition, maintaining a first one of a concentration ratio and a feed ratio at an at least substantially constant value while implementing process changes in an effort to bring produced polymer into compliance with a target specification set and monitoring (without controlling) the other one of the concentration ratio and the feed ratio to generate first data; and during the transition, determining from the first data whether polymer having excessively low density is likely to be produced during the transition, and upon determining that polymer having excessively low density is likely to be produced during the transition, maintaining during the remaining portion of the transition the other ratio at a value that is at least substantially constant while allowing the first ratio to vary is provided.

12 Claims, 5 Drawing Sheets

U.S. PATENT DOCUMENTS

| | | | |
|---|---|---|---|
| 2005/0085598 A1 | 4/2005 | Sandell et al. | 526/64 |
| 2005/0267267 A1 | 12/2005 | Sandell et al. | 526/64 |
| 2005/0282980 A1 | 12/2005 | Szul et al. | |
| 2006/0281878 A1 | 12/2006 | Kolb et al. | 526/88 |
| 2007/0073010 A1 | 3/2007 | Pannell et al. | 526/73 |

FOREIGN PATENT DOCUMENTS

| | | |
|---|---|---|
| WO | WO 03/044061 | 5/2003 |
| WO | WO 2005/049663 | 6/2005 |

METHOD FOR REDUCING AND/OR PREVENTING PRODUCTION OF EXCESSIVELY LOW DENSITY POLYMER PRODUCT DURING POLYMERIZATION TRANSITIONS

CROSS-REFERENCE TO RELATED APPLICATIONS

This application is a National Stage application under 36 U.S.C. §371 of International Application No. PCT/US2007/025678, filed Dec. 12, 2007, that claims the benefit of Ser. No. 60/875,444, filed Dec. 18, 2006, the disclosures of which are incorporated by reference in their entireties.

FIELD OF THE INVENTION

The invention pertains to methods for controlling polymerization reactions (e.g., olefin polymerization reactions in fluidized-bed, gas phase reactors) to implement transitions from an initial reaction (in which a polymer product is produced to meet a first specification set) to a target reaction (in which a polymer product is produced to meet a second specification set). More particularly, the invention pertains to methods for reducing the amount of product and/or preventing production of polymer (having excessively low density) that is produced while implementing such a transition.

BACKGROUND OF THE INVENTION

With reference to two monomers (i.e., of a set of at least two monomers that are polymerized to produce a copolymer), the term "comonomer" is herein used to denote the monomer that decreases the copolymer's density if its relative amount in the copolymer increases. Conversely, with reference to the same two monomers, the term "monomer" (rather than "comonomer") is used to denote the one of these monomers that increases the copolymer's density if its relative amount in the copolymer increases. For example, when hexene and ethylene are polymerized (typically in the presence of a catalyst system) to produce polyethylene, the ethylene is herein referred to as the "monomer" and the hexene is herein referred to as the "comonomer" (since increasing the relative amount hexene in the polyethylene decreases the density of the polyethylene).

Throughout this disclosure, the expression polyethylene denotes a polymer of ethylene and optionally one or more $C_3$-$C_{10}$ alpha olefins (said alpha olefins being comonomers) and the expression polyolefin denotes a polymer of one or more $C_2$-$C_{10}$ alpha olefins, preferably alpha olefins.

Throughout this disclosure, the phrase "off-grade product" (e.g., "off-grade" polymer resin) assumes that the product is produced in a reactor with the intention that it meet a specification set (a set of one or more specifications for one or more properties of the product) and denotes that the product has at least one property that does not meet at least one specification in the specification set. For example, if the specification set requires that the product have a resin flow property (e.g., melt index) within a specified first range and a density within a specified density range, the product is an off-grade product if its resin flow property is outside the first range and/or its density is outside the density range.

A product (e.g., an off-grade product) having "excessively low" density herein denotes a reaction product having density below the low end of a density range specified by a specification set. With reference to an initial polymerization reaction designed to produce a product with properties meeting an initial specification set (including an initial density range for the product) and a target polymerization reaction designed to produce a product with properties meeting a target specification set (including a target density range for the product), the expression that a product has "excessively low density" herein denotes that the product has density below both the initial density range and the target density range.

With reference to a product being produced by a continuous reaction, the expression "instantaneous" value of a property of the product herein denotes the value of the property of the most recently produced quantity of the product. The most recently produced quantity typically undergoes mixing with previously produced quantities of the product before a mixture of the recently and previously produced product exits the reactor. In contrast, with reference to a product being produced by a continuous reaction, "average" (or "bed average") value (at a time "T") of a property herein denotes the value of the property of the product that exits the reactor at time T.

Throughout this disclosure, the abbreviation "MI" denotes melt index and the abbreviation "FI" denotes flow index.

One commonly used method for producing polymers is gas phase polymerization. A conventional gas phase fluidized bed reactor, during operation to produce polyolefins by polymerization, contains a fluidized dense-phase bed including, for example, a mixture of reaction gas, polymer (resin) particles, catalyst, and co-catalyst. Typically, any of several process control variables can be controlled to cause the reaction product to have desired characteristics.

Generally in a gas-phase fluidized bed process for producing polymers from monomers, a gaseous stream containing one or more monomers is continuously passed through a fluidized bed under reactive conditions in the presence of a catalyst. This gaseous stream is withdrawn from the fluidized bed and recycled back into the reactor. Simultaneously, polymer product is withdrawn from the reactor and new monomer and/or comonomer is added to replace the polymerized monomer. The recycled gas stream is heated in the reactor by the heat of polymerization. This heat is removed in another part of the cycle by a cooling system external to the reactor.

The amount of polymer produced in a fluidized bed polymerization process is directly related to the amount of heat that can be withdrawn from the fluidized bed reaction zone since the exothermic heat generated by the reaction is directly proportional to the rate of polymer production. In steady state operation of the reaction process, the rate of heat removal from the fluidized bed must equal the rate of heat generation, such that the bed temperature remains substantially constant. Conventionally, heat has been removed from the fluidized bed by cooling the gas recycle stream in a heat exchanger external to the reactor.

It is important to remove heat generated by the reaction in order to maintain the temperature of the resin and gaseous stream inside the reactor at a temperature below the polymer melting point and/or catalyst deactivation temperature. Heat removal is also important to prevent excessive stickiness of polymer particles that if left unchecked, can result in agglomeration of the sticky particles which can in turn lead to formation of chunks or sheets of polymer that cannot be removed as product (e.g., sheets that cause dome or wall sheeting) and can cause loss of fluidization. Such resin chunks or sheets may fall onto the reactor's distributor plate causing impaired fluidization, and in many cases forcing a reactor shutdown (a "discontinuity" event). Prevention of resin stickiness has been accomplished by controlling the temperature of the fluid bed to a temperature below the fusion or sintering temperature of the polymer particles. Above this fusion or sintering temperature, empirical evidence suggests that such fusion or sintering leads to resin agglomeration or stickiness, which in turn can, if left unchecked, lead to formation of resin chunks or sheets and impaired fluidization.

It is known that production of polymer resin having excessively low density during resin-producing polymerization reactions in fluidized-bed, gas phase reactors is typically undesirable because such resin can be or become sticky at normal reaction temperatures, and that such resin stickiness during the reaction can cause a reactor discontinuity event (e.g., due to sheeting or chunking as mentioned above).

A change from production of one grade of polymer to another typically requires a transition period for a polymerization reactor to switch over to a new resin specification set and corresponding process conditions such as reaction temperature, reactants and reactant concentration ratios. During a transition from an initial polymerization reaction intended to produce an initial resin product meeting a first specification set to a target polymerization reaction intended to produce a target resin product meeting a second specification set, off-grade polymer may be produced whose density (or other property) does not meet either the first or the second specification set. For example, during such a transition off-grade polymer having excessively low density (as herein defined) may be produced. Unless the transition is implemented appropriately, such off-grade product may become sticky under the conditions (including temperature) present during the transition, and agglomeration or sheeting (on the reactor wall or dome) as well as product discharge problems can result. Of course, both the initial and target reactions are typically intended to produce resin that will not become sticky under steady state reaction conditions.

In the typical case that a polymerization reaction transition involves changing at least one of: reactor temperature, monomer concentration (e.g., ethylene partial pressure, in the case of polyethylene polymerization) in the reactor, concentration of isopentane or another induced condensing agent in the reactor, concentration of a continuity agent in the reactor, and concentration of hydrogen in the reactor, or any combination of such reaction parameters, it may not be possible to predict a priori the ratio of comonomer gas concentration to monomer gas concentration in the reactor (e.g., the $C_6$ to $C_2$ gas partial pressure ratio when the reaction is a polyethylene polymerization reaction) or the ratio of feed rates of comonomer and monomer into the reactor that would be required during (or at the end of) the transition to prevent and/or reduce production of product having excessively low density, unless a database regarding each product and process conditions for producing each product is available.

Reactor temperature or monomer concentration changes during such transitions typically cause the solubility (in the polymer) of the reactants and inert materials or induced condensing agents (e.g., isopentane) in the reactor and the reactivities of the reactants to vary. Due to such changes in thermodynamics and kinetics, it is typically not possible to know the precise value at which the concentration of comonomer in the reactor or the feed rate of comonomer flowing into the reactor should be maintained, either during or at the end of the transition. Thus, conventional control of this type of transition typically includes the steps of choosing either the ratio of comonomer concentration to monomer concentration in the reactor (e.g., $C_6/C_2$ concentration ratio) or the comonomer to monomer feed ratio (e.g., $C_6/C_2$ feed ratio) and maintaining the chosen ratio at a constant value (i.e., the value at the start of the transition) while implementing the process changes required to bring the produced polymer into compliance with the target (post-transition) specification set. If the correct ratio is selected, the transition can proceed as desired without a discontinuity event. Often however, the correct ratio is not known, and as a result the conventionally controlled transition produces excessively low density polymer which often causes various associated problems and even undesired reactor shut down (e.g., due to sheeting caused by resin stickiness). In contrast with this type of conventional control, there exists a need to reliably avoid or reduce production of excessively low density polymer during transitions and thus avoid associated problems.

Background references include U.S. Pat. No. 6,649,710, U.S. Patent Application Publication Nos. 2005/267267, 2007/073010, WO 00/32651, WO 03/044061, and WO 2005/049663.

SUMMARY

With reference to operation or control of a fluidized bed reactor, the expression "concentration ratio" (or "comonomer to monomer concentration ratio") denotes the ratio of comonomer gas concentration to monomer gas concentration in the reactor (e.g., ratio of comonomer and momoner gas partial pressures in the reactor) and the expression "feed ratio" (or "comonomer to monomer feed ratio") denotes the ratio of the feed rate of comonomer into the reactor to the feed rate of monomer into the reactor.

In a class of embodiments, the invention is a method for controlling a transition from an initial polymerization reaction to a target polymerization reaction in a fluidized bed reactor in a manner that reduces significantly the amount of off-grade product having excessively low density that is produced during the transition, by maintaining a selected one of a concentration ratio (e.g., a $C_6/C_2$ concentration ratio) and a feed ratio (e.g., a $C_6/C_2$ feed ratio) at an at least substantially constant value during at least part of the transition. "Significant reduction" of the amount of product produced denotes significant reduction below the amount that would be produced if the selected ratio were not maintained at constant (or substantially constant) value and were instead allowed vary during the transition.

The initial polymerization reaction is to produce polymer product with properties that meet a first (or initial) specification set, and the target polymerization reaction is to produce polymer resin product with properties that meet a second (or target) specification set including a target density range for the product. In some embodiments, the method includes the steps of: (a) during the transition, maintaining (preferably, commencing at the start of the transition) a first one of a concentration ratio and a feed ratio at an at least substantially constant value (typically, the value of said first one of the concentration ratio and the feed ratio at the start of the transition) while implementing process changes in an effort to bring produced polymer into compliance with the second specification set and monitoring the other one of the concentration ratio and the feed ratio to generate first data without controlling said other one of the concentration ratio and the feed ratio; and (b) during the transition, determining from the first data whether polymer having excessively low density is likely to be produced during the transition, and upon determining from the first data that polymer having excessively low density is likely to be produced during the transition, maintaining during the remaining portion of the transition said other one of the concentration ratio and the feed ratio at a value that is at least substantially constant (typically, at its value as of determination that polymer having excessively low density is likely to be produced) while allowing the first one of the concentration ratio and the feed ratio to vary. In some embodiments, the determination in step (b) that polymer having excessively low density is likely to be produced during the transition is a determination that said other one of the concentration ratio and the feed ratio has increased to a predetermined threshold value.

In a class of embodiments, both the initial polymerization reaction and the target polymerization reaction produce polyethylene in a fluidized bed reactor, the comonomer to monomer feed ratio is the ratio of the feed rate of hexene or butene (a comonomer) into the reactor to the feed rate of ethylene (a monomer) into the reactor, and the comonomer to monomer concentration ratio is the ratio of hexene or butene gas concentration to ethylene gas concentration in the reactor. Until the present invention it had not been known how to choose between control of the comonomer to monomer concentration ratio and the comonomer to monomer feed ratio to implement such transitions, to prevent occurrence of a reactor discontinuity event or resin stickiness during such transitions.

In some embodiments, the inventive control method prevents or reduces production of polymer product having excessively low density during the transition. Reduction or prevention of excessively low density polymer resin production makes the transition safer and more robust and reduces reactor outages due to shutdowns.

Various embodiments of the inventive method can be performed to control a variety of different transitions (e.g., from high to low ethylene partial pressure, from low to high ethylene partial pressure, from low to high reactor temperature, or from high to low reactor temperature). Although specific examples are described herein, the invention as defined by the broadest claims is not intended to be limited to these embodiments.

Typical embodiments of the invention are methods for controlling transitions in polymerization reactions in which the monomer is ethylene, the comonomer is hexene and/or butene, the reaction proceeds in the presence of a catalyst or catalyst system (e.g., a hafnium or zirconium metallocene catalyst, e.g., as described in U.S. Pat. Nos. 6,242,545, 6,528, 597, or U.S. Patent Application Publication No. US 2005/0282980 A1, and the polymer product is polyethylene.

BRIEF DESCRIPTION OF THE DRAWINGS

FIG. 3 consists of graphs of measured parameters (versus time) of a polyethylene polymerization reaction in a fluidized bed reactor. The parameters are tripled reactor temperature (curve "T") as marked along the vertical axis at the right of FIG. 3, monomer partial pressure (curve "A") in units of PSI as marked along the vertical axis at the right, comonomer to monomer feed ratio (curve "B") in units of mole/mole as marked along the vertical axis at the left, and comonomer to monomer concentration ratio (curve "C") in units of mole/mole, as marked along the vertical axis at the left.

DETAILED DESCRIPTION

A reactor system whose operation can be controlled (and optionally also monitored) may be described with reference to FIG. 1. The FIG. 1 system includes fluidized bed reactor 10. Reactor 10 has a bottom end 11, a top expanded section 19, a cylindrical (straight) section 14 between bottom end 11, and a distributor plate 12 within section 14. A fluidized bed 15 of granular polymer and catalyst particles is contained within the straight section 14. The bed is fluidized by the steady flow of recycle gas through the distributor plate 12. The flow rate of fluidizing gas is regulated to provide the fluidized bed with relatively good mixing, as illustrated in the figure.

Figure 1:
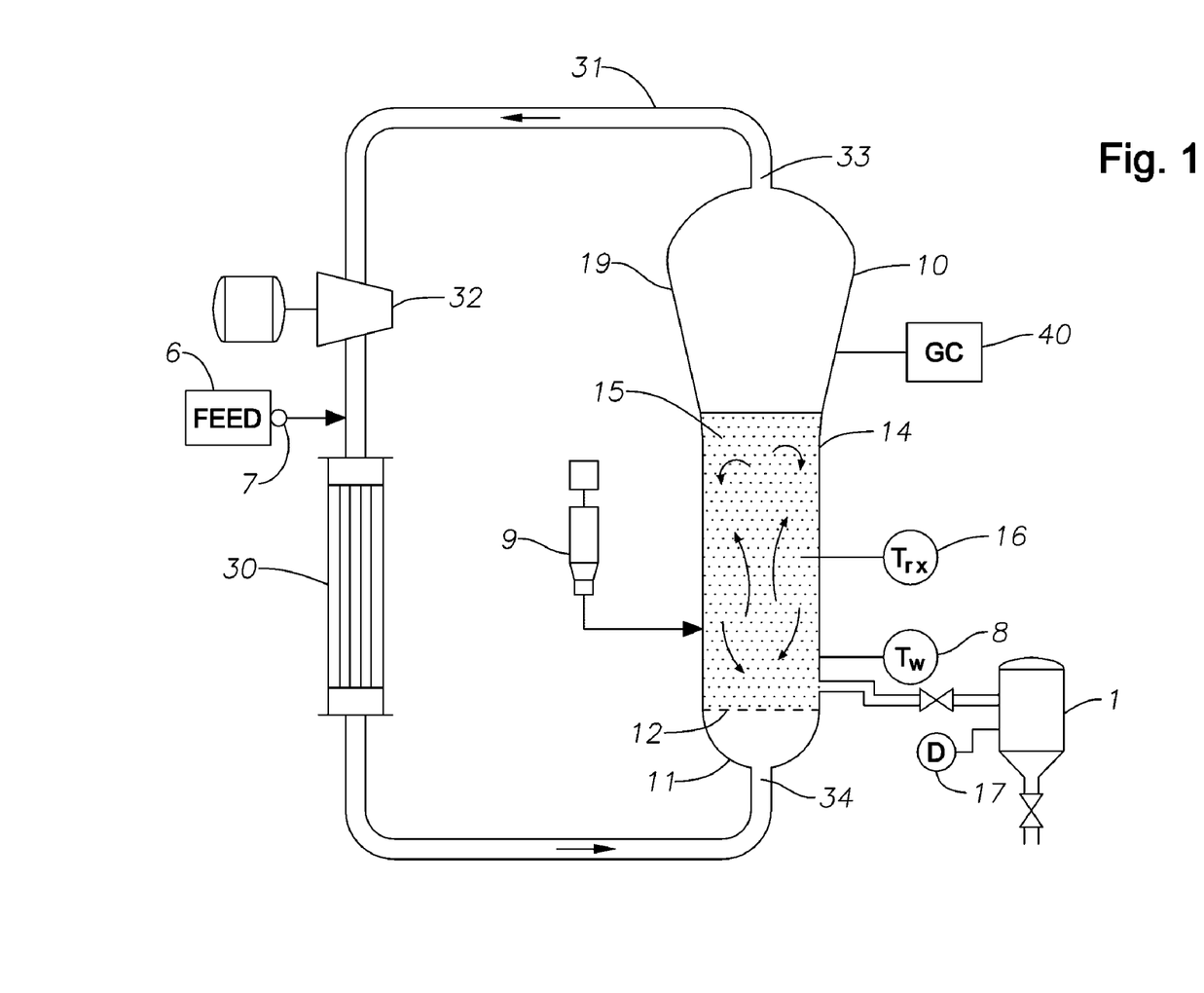
FIG. 1 is a simplified cross-sectional view of a reaction system including a fluidized bed reactor (10) whose operation can be controlled and optionally also monitored in accordance with the invention.

The reactor system of FIG. 1 has a reactant feed subsystem 6 for performing controlled addition of monomer and each comonomer into the reactor 10. Subsystem 6 allows independent control of the feed rate of the monomer and each comonomer. Feed rate monitoring subsystem 7 monitors the feed rate of monomer into the reactor and the feed rate of each comonomer into the reactor. The reactor system includes a monitor to monitor reaction parameters, preferably including reactor gas composition, e.g., concentrations (and partial pressures) of all monomer and comonomer gases and induced condensing agents (ICAs), as well as other components such as, for example, air, gases (such as nitrogen, hydrocarbon inerts, etc.) that are present in relevant quantities. The reactor gas composition may be measured with a gas chromatograph system 40.

The reactor system of FIG. 1 also includes catalyst feeder 9 for controlled addition of polymerization catalyst to the fluidized bed reaction zone. Within the reaction zone (i.e. the fluidized bed), the catalyst particles react with the monomer (e.g., ethylene) and comonomer gas to produce granular polymer particles. As new polymer particles are produced, other polymer particles are withdrawn from the fluidized bed through product discharge system 1. After passing through the product discharge system, the polymer granules are degassed (or "purged") with a flow of inert gas, such as nitrogen, to remove substantially all of the dissolved hydrocarbon materials.

The reactor system of FIG. 1 has a cooling control loop which includes a recycle gas line 31, a circulating gas cooler 30 and compressor 32, coupled with reactor 10 as shown. During operation, cooled circulating gas from cooler 30 flows through inlet 34 into reactor 10 and then propagates upward through the bed and out from reactor 10 via outlet 33.

The expanded section 19, sometimes referred to as a velocity reduction zone, is designed to minimize the quantity of entrained particles that leave the fluidized bed. Each diameter of each horizontal cross-section of the expanded section 19 is greater than the diameter of straight section 14. The increased diameter causes a reduction in the speed of the fluidizing gas, which allows most of the entrained particles (catalyst and resin particles) to settle back into the fluidized bed, thereby minimizing the quantities of solid particles that are carried over from the fluidized bed (at a given value of fluidizing gas velocity) through the recycle gas line 31.

Typically, one or more temperature sensors 16 are located in the fluidized bed, and are used with a control system (not shown in FIG. 1 but which can include processor 50 of FIG. 2) and an external cooling loop to control the fluidized bed temperature near the process set-point. Relatively warm reactor gas (whose temperature has increased during its flow through reactor 10) is withdrawn from outlet 33 and is pumped by compressor 32 to cooler 30, wherein the temperature of the gas (the cooling fluid) is reduced. The relatively cool fluid (which may contain condensed liquid) from cooler 30 flows to the reactor inlet 34, to cool the fluidized bed. Temperature sensors (not shown) near the inlet and outlet of cooler 30 can provide feedback to the control system regulate the amount by which cooler 30 reduces the temperature of the fluid entering reactor.

The FIG. 1 system also includes "skin temperature" sensors 8 (typically implemented as thermocouple sensors having fast response design) mounted in positions along straight section 14 of the reactor wall so as to protrude into the bed from the reactor wall by a small amount (e.g., one eighth to one quarter of an inch). Sensors 8 are configured and positioned to sense the temperature of the resin near the wall of reactor 10 during operation.

The one or more temperature sensors 16 in the fluidized bed can include at least one resistance temperature sensor positioned and configured to sense bed temperature during reactor operation at a location within reactor 10 away from the reactor wall. The resistance temperature sensor can be mounted so as to protrude into the bed (e.g., 8 to 18 inches away from the reactor wall) more deeply than do sensors 8.

Other sensors and optionally also other apparatus are employed to measure other reaction parameters during a polymerization reaction within reactor 10. Such other reaction parameters typically include instantaneous and bed-averaged resin product properties (e.g., melt index and density of the polymer resin product being produced by the FIG. 1 system during a polymerization reaction). For example, product density determination subsystem 17 can be employed to measure density (i.e., the instantaneous value of density) of the polymer resin product being produced by the FIG. 1 system. Polymer product density and other product properties can be determined in a conventional manner by periodically sampling the resin as it exits the reactor (e.g., once per hour), and performing appropriate tests (e.g., using equipment included in subsystem 17) in a quality control laboratory.

It is well known how to control various process control variables to control various reactions performed by the FIG. 1 system. For example, it is well known how to control gas phase composition within reactor 10, including concentration of induced condensing agents (ICAs) and comonomer introduced into reactor 10, partial pressure of each reactant (e.g., ethylene or other monomer), how to control the type and properties of each catalyst introduced into reactor 10, and how to use elements 30 and 32 in the manner described above to control temperature.

To control a polymerization reaction during a transition by controlling process control variables such that the product (granular polymer resin) has properties compliant with an initial specification set at the start of the transition, the product produced during the transition ceases to comply with the initial specification set at a first time, and the product has properties compliant with a final specification set at the end of the transition, subject to the constraint that one of a comonomer to monomer concentration ratio and a comonomer to monomer feed ratio is held at an at least substantially constant value (although which one of these ratios should be held constant or substantially constant is preferably determined in accordance with the present invention). In particular, it is within the skill in the art how to program processor 50 of FIG. 2 to generate control signals for so controlling a polymerization reaction during a transition subject to the constraint that one of the comonomer to monomer concentration ratio and the comonomer to monomer feed ratio is held at an at least substantially constant value during the transition. Processor 50 may be a separate, stand alone processor, or it may be integral with other process control computers that are conventionally used to monitor and control the reactor system.

Figure 2:
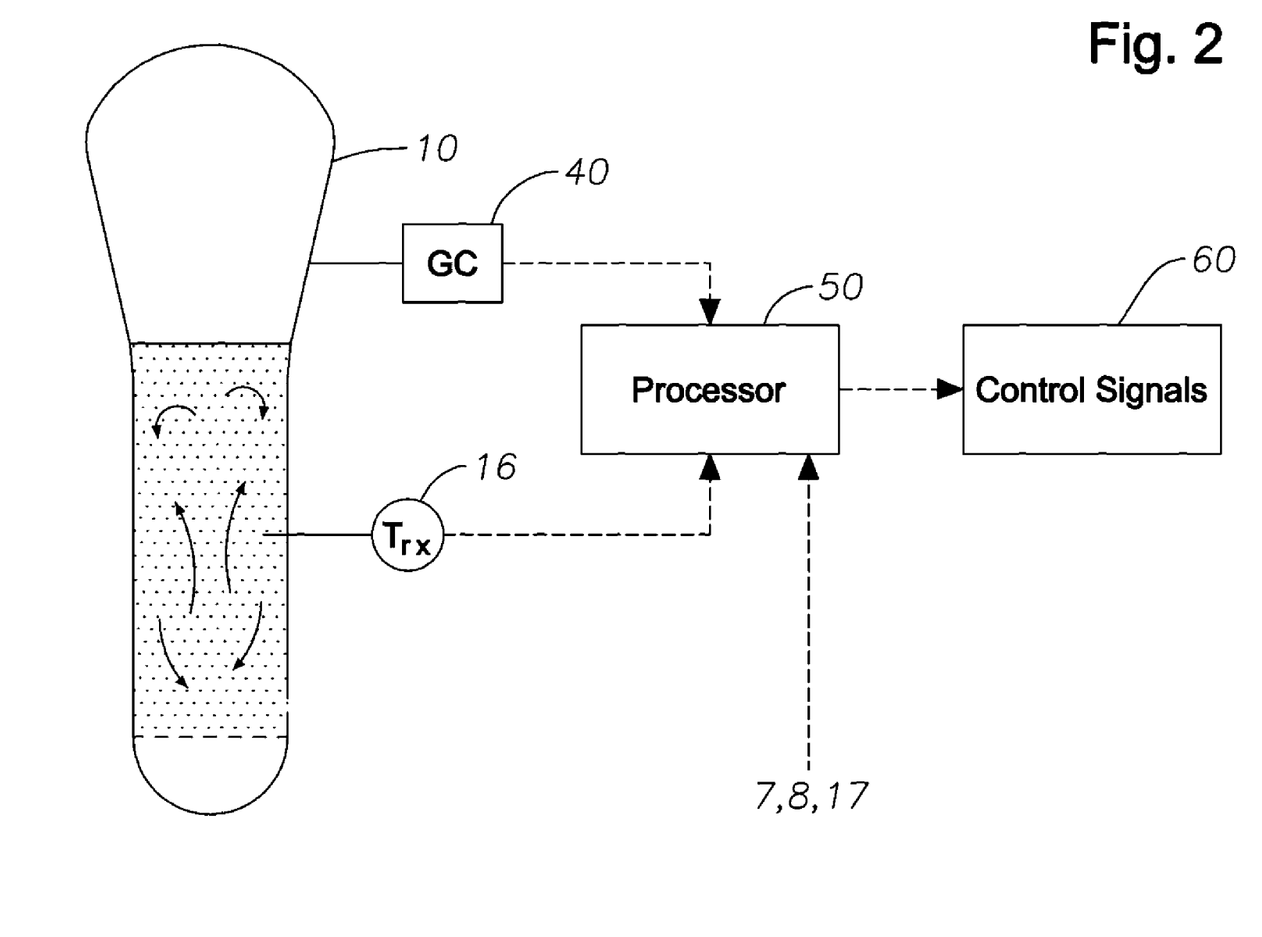
FIG. 2 is a block diagram of some elements of the FIG. 1 system and additional elements for generating control signals (60) in accordance with a class of embodiments of the invention for use in controlling transition in a polymerization reaction performed by the FIG. 1 system.

In a class of embodiments, a transition between an initial reaction and a target reaction performed by a polymerization reactor is controlled by control signals 60 generated by programmed processor 50 of FIG. 2. In some such embodiments, processor 50 is programmed to generate at least one control signal 60 (to feed unit 6 and optionally other process control subsystems) in accordance with the invention in response to comonomer and monomer feed rate data (from subsystem 7) indicative of comonomer and monomer feed rates during the transition, or data (from process gas chromatograph 40) indicative of comonomer gas concentration (e.g., partial pressure) and monomer gas concentration in the reactor during the transition. This control signal causes (or indicates to the reactor operators that they should cause) one of the comonomer to monomer concentration ratio and the comonomer to monomer feed ratio (which had been held at an at least substantially constant value) to be allowed to vary and the other of the comonomer to monomer concentration ratio and the comonomer to monomer feed ratio to begin to be held at an at least substantially constant value. In a second class of embodiments of the inventive control method, a reactor operator determines (in accordance with the invention) which one of a comonomer to monomer concentration ratio and a comonomer to monomer feed ratio should be held at an at least substantially constant value during the transition, and processor 50 generates control signals 60 in a conventional manner for controlling the reaction during the transition subject to the constraint that this one of the comonomer to monomer concentration ratio and comonomer to monomer feed ratio is held at least substantially constant.

In some embodiments, processor 50 is typically programmed to generate conventionally some control signals 60 (for controlling the reaction during the transition) in response to the output of subsystem 7 and process gas chromatograph 40 and other data indicative of reaction parameters determined by monitoring the reaction during the transition (e.g., temperature data determined by the output of temperature sensors 8 and 16, and data indicative of resin density and MI and other resin properties). The transition is controlled in response to the control signals 60 generated by processor 50 and typically also in response to actions affirmatively taken by reactor operators.

To implement some embodiments of the inventive method, processor 50 receives (or generates in response to data from chromatograph 40) data indicative of comonomer to monomer concentration ratio, and receives (or generates in response to data from subsystem 7) data indicative of comonomer to monomer feed ratio, and generates at least one control signal 60 for use in causing an appropriate one of the comonomer to monomer concentration ratio and the comonomer to monomer feed ratio to be maintained at an at least substantially constant value at appropriate times during the transition (e.g., during the entire transition when appropriate).

Figure 3:
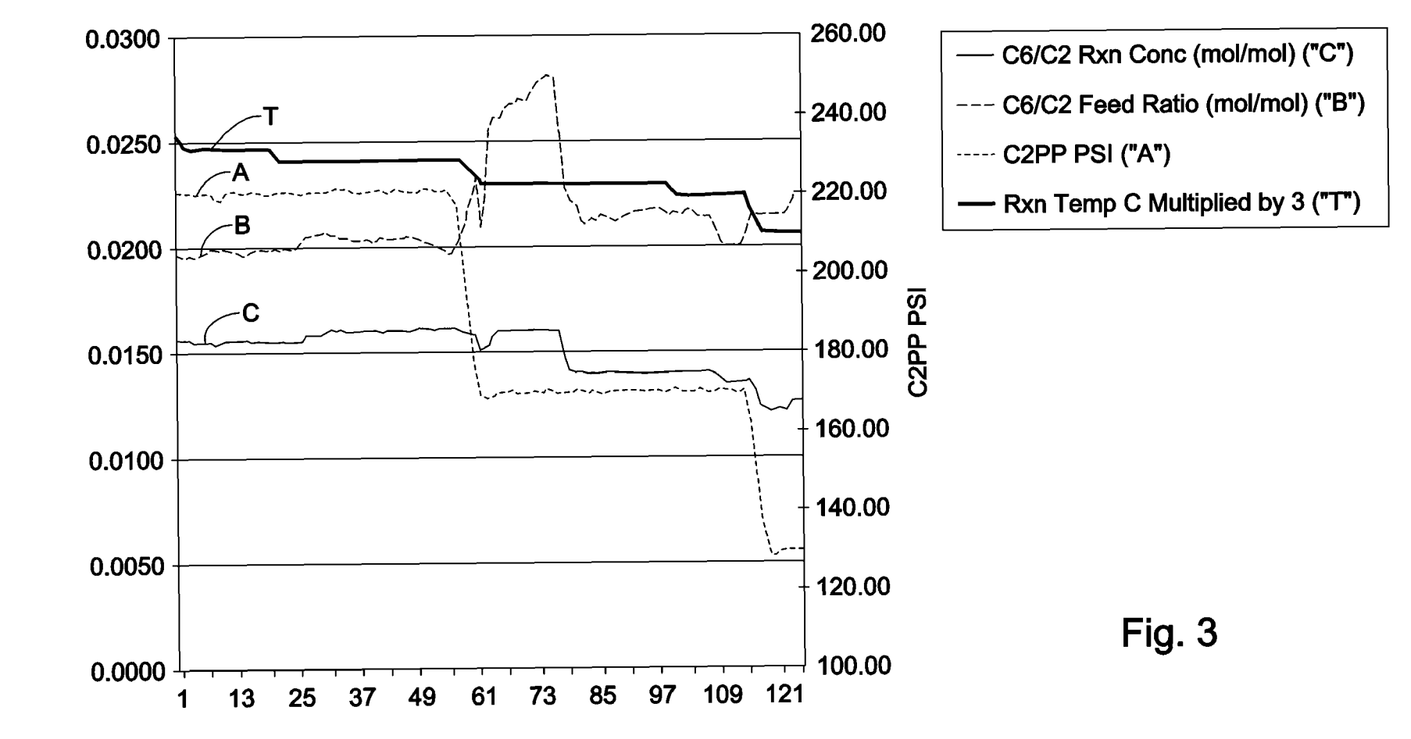
Figure 4:
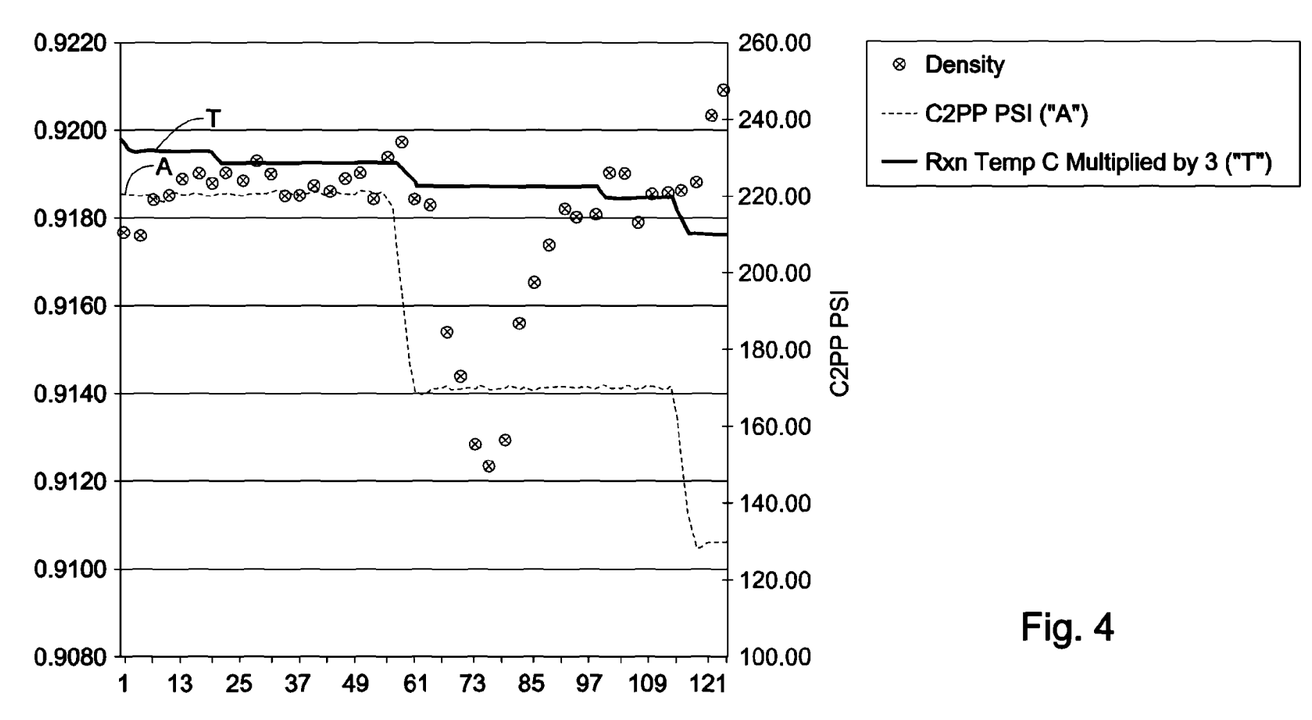
FIG. 4 is a graph of measured density of the polyethylene produced during the FIG. 3 reaction (in grams per cubic centimeter as marked along the vertical axis at the left) versus time, with curves A and T of FIG. 3 superimposed thereon.
Figure 5:
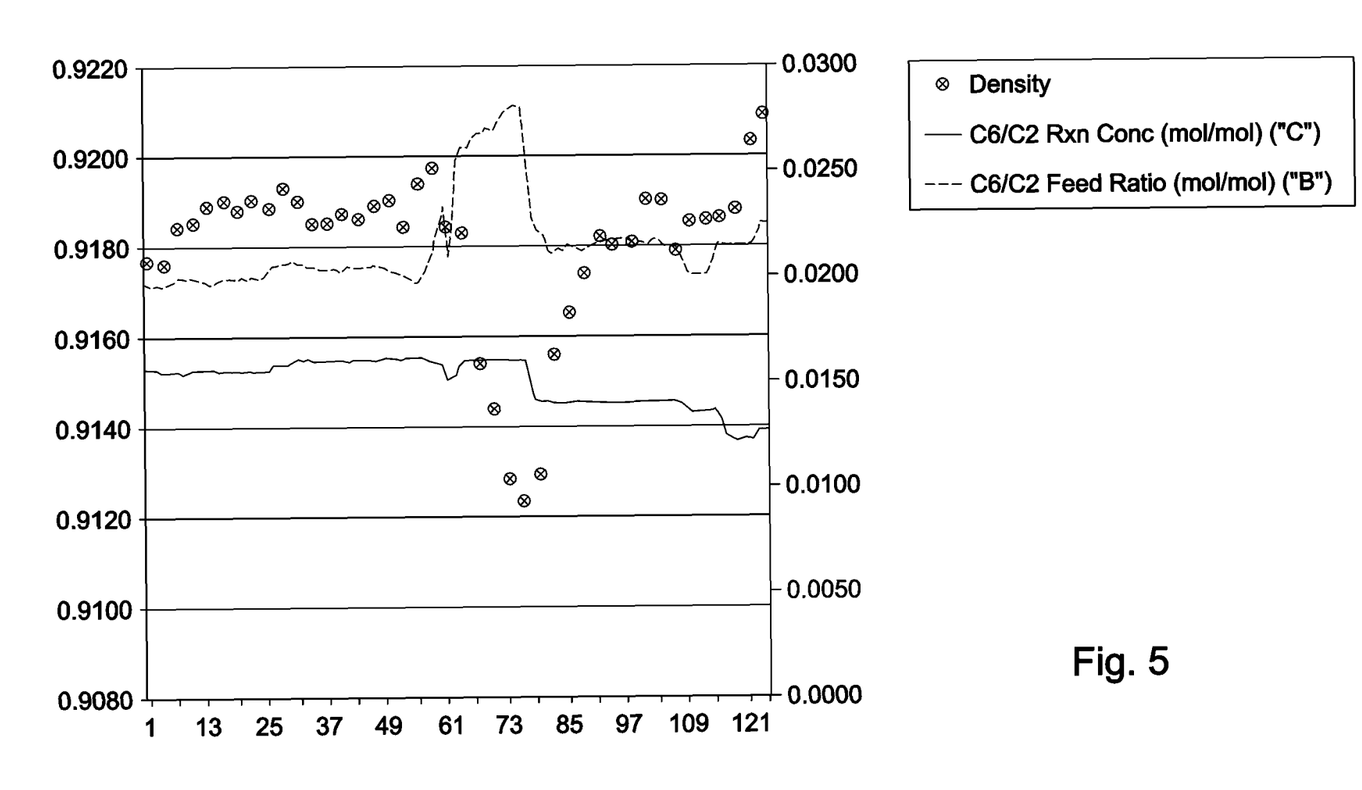
FIG. 5 is a graph of measured density of the polyethylene produced during the FIG. 3 reaction (in grams per cubic centimeter as marked along the vertical axis at the left) versus time, with curves B and C of FIG. 3 superimposed thereon.

We shall describe several embodiments of the invention in greater detail with reference to FIGS. 3-5. FIGS. 3-5 represent data generated by monitoring a polyethylene polymerization reaction in a fluidized-bed, gas phase reactor during two reaction transitions. In each of FIGS. 3-5, time (in units of hours) is marked along the horizontal axis, a first transition commences at about time T=55 hours, and the second transition commences at about time T=113 hours.

In FIG. 3, curve "T" is a plot of tripled reactor temperature (three times the reactor temperature) in units of degrees C.

versus time, with tripled temperature values marked along the vertical axis at the right of FIG. 3, curve "A" is a plot of monomer (ethylene) partial pressure (in units of PSI, as marked along the vertical axis at the right) versus time, curve "B" is comonomer (hexene) to monomer (ethylene) feed ratio ("$C_6/C_2$ feed ratio," in units of mole/mole as marked along the vertical axis at the left) versus time, and curve "C" is comonomer (hexene) to monomer (ethylene) concentration ratio ("$C_6/C_2$ concentration ratio," in units of mole/mole, as marked along the vertical axis at the left) versus time. In each of FIGS. 4 and 5, measurements of density of the produced polyethylene (in grams per cubic centimeter as marked along the vertical axis at the left) plotted versus time. In FIG. 4, curves A and T are superimposed on these measurements, and in FIG. 5 curves B and C are superimposed on these measurements.

During generation of the data plotted in FIGS. 3-5, the reactor was not fitted with a vent recovery system for recycling unreacted monomers and condensing agents back to the reactor. Because vent recovery was not used, the relationships between reactant concentration ratios and feed ratios are offset due to the vent losses. In a large, modern and cost-effective manufacturing process it is typical to use a vent recovery system that collects and recycles unreacted monomers and condensing agents back to the reactor. It will be readily apparent to those of ordinary skill in the art from the present disclosure how to modify the methodology described herein with reference to a reactor not fitted with vent recovery, to control transitions in reactors having vent recovery systems.

The polymerization reaction ongoing during generation of the data plotted in FIGS. 3-5 proceeded (and other polymerization reactions controlled in accordance with typical embodiments of the invention can proceed) in the presence of a hafnium or zirconium metallocene catalyst system (of the type described in, for example, U.S. Pat. No. 6,528,597, and U.S. Patent Application Publication No. US 2005/0282980 A1). Other polymerization reactions controlled in accordance with typical embodiments of the invention can proceed in the presence of other catalysts or catalyst systems (e.g., other metallocene catalyst systems).

With reference to FIGS. 3-5, the initial polymerization reaction (prior to T=55) produced polyethylene product having a melt index (MI) of 0.6 and a density of 0.918 g/cc at 220 psi ethylene partial pressure and 76 degrees C. reactor temperature, where the $C_6/C_2$ concentration ratio is 0.016 mole/mole and the $C_6/C_2$ feed ratio is 0.02 mole/mole. At time T=55, the ethylene partial pressure (indicated by curve "A") was decreased from 220 to 170 psi and the reactor temperature (indicated by curve "T") was decreased from 76 to 74 degrees C., with the intention to continue to produce polyethylene having a density of 0.918 g/cc (i.e., to produce polyethylene in accordance with a target specification set including a target density of 0.918 g/cc). During the transition commencing at T=55, the $C_6/C_2$ concentration ratio was held substantially constant (at 0.016 mole/mole) to control the transition while $C_6/C_2$ feed ratio was allowed to vary. Curve C of FIG. 3 indicates that initially the $C_6/C_2$ concentration ratio decreased slightly and then came back to the 0.016 mole/mole set point (due to dynamic solubility and reactivity effects). However, the $C_6/C_2$ feed ratio increased dramatically until about time T=75 as it tried to maintain the reactor concentration.

FIGS. 4 and 5 show that from time T=55 to time T=76, the polymer density decreased very rapidly and by time T=76 the density had decreased to about 0.912 gm/cc. Thus, at time T=76, the reaction instantaneously produced polymer having excessively low density (well below the target density of 0.918 g/cc). Such excessively low density polymer production was likely to cause reactor shutdown due to polymer stickiness and difficulty with product discharge from the reactor. Fortunately, in this particular case, the reactor did not shut down, and (because monitoring of instantaneous product density indicated production of excessively low density polymer) the $C_6/C_2$ concentration ratio was decreased to a set point of 0.014 mole/mole (at about T=76). This $C_6/C_2$ concentration ratio set point change caused the $C_6/C_2$ feed rate to decrease and both these changes caused the polymer density to increase back towards the higher (target) density of 0.918 g/cc.

It was not known a priori that the $C_6/C_2$ concentration ratio should be 0.014 mole/mole during the transition commencing at time T=55. If it had been, the transition could have been controlled by holding the $C_6/C_2$ concentration ratio at 0.014 during the transition (commencing at the start of the transition). This would have prevented the low density excursions.

After the change at T=76 to a lower $C_6/C_2$ concentration ratio of 0.014, the $C_6/C_2$ feed ratio stabilized at 0.0213 mole/mole at about time T=100. This $C_6/C_2$ feed ratio was higher than the original steady state value of 0.02 prior to the beginning of the transition. In summary, it was determined that the transition (commencing at T=55) to lower monomer concentration ($C_2$ partial pressure) and lower reactor temperature required running at a lower $C_6/C_2$ concentration ratio and a higher $C_6/C_2$ feed ratio to achieve the target product properties, but this was not known a priori. In lieu of knowing what $C_6/C_2$ concentration ratio or feed ratio to use for the transition which commenced at T=55, the two control options were to either maintain constant the $C_6/C_2$ concentration ratio or the $C_6/C_2$ feed ratio (it was known a priori that both ratios could not be maintained constant). Due to the random choice to maintain substantially fixed the $C_6/C_2$ concentration ratio during the transition, polymer having excessively low density was produced during the transition. This in turn caused unsafe and risky reactor operation.

The inventors have recognized that it is preferable to control comonomer to monomer concentration ratio (rather than comonomer to monomer feed ratio) during certain types of transitions in certain types of polymerization reactions (e.g., polyethylene polymerization reactions of the type characterized by the data plotted in FIGS. 3-5, performed in a gas phase fluidized bed reactor lacking a vent recovery system in the presence of a hafnium metallocene catalyst) and that it is preferable to control comonomer to monomer feed ratio (rather than comonomer to monomer concentration ratio) during other types of transitions in these reactions. Specifically, the inventors have recognized that a preferred method for controlling a transition from an initial polymerization reaction (of one of these types) to a target polymerization reaction (of one of these types) includes the steps of: (a) determining whether the target polymerization reaction has higher reactor temperature and higher monomer concentration (e.g., ethylene partial pressure) than the initial polymerization reaction, and whether the target polymerization reaction has lower reactor temperature and lower monomer concentration than the initial polymerization reaction; (b) upon determining that the target polymerization reaction has higher reactor temperature and higher monomer concentration than the initial polymerization reaction, maintaining comonomer to monomer concentration ratio at an at least substantially constant value during the transition and allowing comonomer to monomer feed ratio to vary during the transition; and (c) upon determining that the target polymerization reaction has lower reactor temperature and lower monomer concentration than the initial polymerization reaction, maintaining comonomer to monomer feed ratio at an at least substantially constant value during the transition and allowing comonomer to monomer concentration ratio to vary during the transition.

Thus, to control the transition (commencing at T=55) described with reference to FIG. 3 in accordance with one such method, the $C_6/C_2$ feed ratio is maintained at a constant or substantially constant value (e.g., its value as of T=55) during the transition and the $C_6/C_2$ concentration ratio is allowed to vary (and is not controlled) during the transition. The $C_6/C_2$ feed ratio may be maintained at a sequence of different values during the transition when appropriate, with its value being held constant (or substantially constant) during each step of such sequence, but the $C_6/C_2$ concentration ratio is allowed to vary (and is not controlled) during the entire transition. If the transition (commencing at T=55) had been controlled as described in this paragraph, polymer density produced during the transition would have been higher than the target density (not lower than the target density as in FIGS. 4 and 5) and thus the transition would have been implemented in a safer manner by preventing the production of excessively low density polymer.

The methods described in the two previous paragraphs are based on recognition by the inventors that for a broad class of transitions from an initial polymerization reaction to a target polymerization reaction having higher reactor temperature and higher monomer concentration than the initial polymerization reaction, maintaining (at an at least substantially constant value) the comonomer to monomer feed ratio while allowing the comonomer to monomer concentration ratio to vary is ineffective to prevent production of product having excessively low density during the transition (and thus cannot reliably prevent undesired polymer agglomeration), and that for a broad class of transitions from an initial polymerization reaction to a target polymerization reaction having lower reactor temperature and lower monomer concentration than the initial polymerization reaction, maintaining (at an at least substantially constant value) the comonomer to monomer concentration ratio while allowing the comonomer to monomer feed ratio to vary is ineffective to prevent production of product having excessively low density during the transition (and thus cannot reliably prevent undesired polymer agglomeration).

With reference again to the example described above with reference to FIGS. 3-5, the $C_6/C_2$ feed ratio at the end of the transition was actually higher than at the start (at T=55) of the transition. When controlling a transition in accordance with the invention by maintaining $C_6/C_2$ feed ratio at an at least substantially constant value (during the entire transition or during each of a sequence of intervals during the transition), polymer density would typically be monitored. During the transition (e.g., after several hours into the transition), if the data generated by monitoring polymer density showed that the polymer density was increasing above the target density, the operator (in response to the data indicating density increasing above the target density) would slightly increase the $C_6/C_2$ feed ratio in small steps until the polymer density decreases back to the target density, thereby controlling the transition to its end without allowing production of significant quantities of polymer having excessively low density.

An example of comonomer to monomer feed ratio control in accordance with the invention is control of the second transition indicated in FIGS. 3-5, i.e., the transition commencing at T=113 hours. At time T=113 hours, the ethylene partial pressure (indicated by curve "A") was decreased from 170 to 130 psi and the reactor temperature (indicated by curve "T") was decreased from 74 to 73 degrees C., with the intention to continue to produce polyethylene having a density of 0.918 g/cc (i.e., to produce polyethylene in accordance with a target specification set including a target density of 0.918 g/cc). It was not known a priori what the $C_6/C_2$ concentration ratio or $C_6/C_2$ feed ratio should be at the end of this second transition, but the choice was made to maintain the $C_6/C_2$ feed ratio at a value substantially equal to 0.021 mole/mole during the second transition starting at T=113, and since $C_6/C_2$ concentration ratio (monitored during the second transition in accordance with the invention) began to decrease (which was recognized to be indicative of increasing polymer density), it was decided to continue to control the $C_6/C_2$ feed ratio during the transition. By time T=121 during the second transition the operator determined (from monitored polymer density data) that the polymer density was increasing above the target density. Although such increase in polymer density desirably prevented production of excessively low density polymer, it triggered the operator's decision (also in accordance with the invention) to maintain the $C_6/C_2$ feed ratio at an increased value (0.023 mole/mole) commencing at time T=122 to cause the instantaneous polymer density to fall to the target density. By so controlling $C_6/C_2$ feed ratio during the second transition in accordance with the invention, it was possible to ensure that the polymer density would not drop below the target density during the transition and allow the operator to adjust the $C_6/C_2$ feed ratio in a controlled manner (while allowing the $C_6/C_2$ concentration ratio to vary in an uncontrolled manner) to reach an end of the transition by achieving production of polymer having the target density.

In accordance with other embodiments of the invention, a transition in a polymerization reaction (e.g., a polyethylene polymerization reaction performed in the reactor of FIGS. 3-5 in the presence of a hafnium metallocene catalyst) in which both reactor temperature and monomer partial pressure increases is controlled by maintaining comonomer to monomer (e.g., $C_6/C_2$) concentration ratio at an at least substantially constant value (during the entire transition or during each of a sequence of intervals during the transition) and allowing comonomer to monomer (e.g., $C_6/C_2$) feed ratio to vary (without controlling the feed ratio). This ensures that the instantaneous density of the polymer produced during the reaction would not be less than the target density and would thus reduce the risk of reactor shut down (and other problems) associated with production of excessively low density polymer. If the polymer product density were monitored as the transition proceeded, small steps in the comonomer to monomer concentration ratio could then be made (while allowing the comonomer to monomer feed ratio to vary) to safely cause the product density to move into compliance with the value (or range of values) specified by the target specification set.

During the poorly controlled transition (not controlled in accordance with the present invention) commencing at T=55 of FIG. 3, the non-controlled feed ratio quickly developed an excursion (apparent from curve B of FIG. 3) consistent with production of excessively low density polymer. The inventors have recognized that when maintaining one of comonomer to monomer concentration ratio and feed ratio at a constant or substantially constant value (during an entire transition or during each of a sequence of intervals during the transition) and allowing the other one of comonomer to monomer concentration ratio and feed ratio to vary, the non-controlled ratio is preferably monitored during the transition to determine whether it (e.g., its magnitude or the magnitude of its first time derivative) is indicative of production of excessively low density polymer, and the results of this monitoring should be used to determine whether the proper one of comonomer to monomer concentration ratio and feed ratio is being controlled during the transition.

Thus, in a class of embodiments, the inventive method for controlling a transition from an initial polymerization reaction (designed to produce polymer product with properties that meet a first specification set including an initial density range for the product) to a target polymerization reaction (designed to produce polymer product with properties that meet a second specification set including a target density range for the product) includes the steps of: (a) during the transition, maintaining (preferably commencing at the start of the transition) a first one of a concentration ratio and a feed ratio at an at least substantially constant value (typically, the value of said first one of the concentration ratio and the feed ratio at the start of the transition) while implementing process changes in an effort to bring produced polymer into compliance with the second specification set and monitoring the other one of the concentration ratio and the feed ratio to generate variable ratio data without controlling said other one of the concentration ratio and the feed ratio; and (b) during the transition, determining from the variable ratio data whether polymer having excessively low density is likely to be produced during the transition, and upon determining from the variable ratio data that polymer having excessively low density is likely to be produced during the transition, maintaining during the remaining portion of the transition said other one of the concentration ratio and the feed ratio at a value that is at least substantially constant (typically, at its value as of determination that polymer having excessively low density is likely to be produced) and allowing the first one of the concentration ratio and the feed ratio to vary. In typical embodiments in this class, the determination in step (b) that polymer having excessively low density is likely to be produced during the transition is a determination that the presently non-controlled one of the concentration ratio and the feed ratio has increased to a predetermined threshold value. Algorithms can be performed by control logic for controlling the reactor (during step (b)) and/or comonomer to monomer flow ratio clamps and/or alarms can be used (during step (b)) to signal that the incorrect ratio was initially maintained at a constant or substantially constant value during step (a), and control of this ratio can be terminated and control of the other ratio commenced (in step (b)) automatically by the process controller (e.g., in response to control signals 60 generated by processor 50 of FIG. 2). Alternatively, those of ordinary skill in the art could monitor the non-controlled one of the comonomer to monomer concentration ratio and feed ratio (and/or other process trends) during the transition, and could manually trigger a change to control of the other one of the concentration ratio and feed ratio in response to the monitored data (and/or each monitored process trend).

With reference again to the poorly controlled transition commencing at T=55 of FIG. 3, the upward-going excursion in $C_6/C_2$ feed ratio (as indicated by curve "B") began to occur at the start of the transition because the final set point for the $C_6/C_2$ concentration ratio was actually lower then prior to the transition. If this final set point for $C_6/C_2$ concentration ratio had been known a priori then it would have possible to prevent the comonomer feed ratio excursion (by reducing the value at which the $C_6/C_2$ concentration ratio was maintained). However, the proper final set point for the $C_6/C_2$ concentration ratio was not known a priori and was not determined until after production of a significant amount of excessively low density product.

Still with reference to the poorly controlled transition commencing at T=55 of FIG. 3, if the non-controlled $C_6/C_2$ feed ratio had been monitored during the transition and it had been determined from the monitored ratio (in accordance with the invention) soon after the start of the transition that the upward-going excursion in the $C_6/C_2$ feed ratio was indicative of likely imminent production of polymer having excessively low density, control signals 60 could have been generated to trigger (or the operator could otherwise have triggered) a change in the transition control method (in accordance with the invention), such that during the remaining portion of the transition the $C_6/C_2$ feed ratio would have been maintained at constant or substantially constant value (e.g., its value as of determination that polymer having excessively low density was likely to be produced) and the $C_6/C_2$ concentration ratio would have been allowed to vary without being controlled during the remaining portion of the transition. In other words, given an incorrect choice of the ratio to be controlled at the start of the transition, if and when monitoring of the non-controlled ratio indicated likely imminent production of polymer having excessively low density, the initially incorrectly non-controlled ratio could have immediately or promptly begun to be controlled and could have continued to be controlled during the remaining portion of the transition (while the initially incorrectly controlled ratio was allowed to vary during the remaining portion of the transition). If the correct choice of the ratio to be controlled were made at the start of a transition, then monitoring of the non-controlled ratio would indicate (typically, by indicating that the non-controlled ratio decreased or remained constant) that the transition is proceeding safely without likelihood that polymer having excessively low density is being or will be produced.

We next describe examples of commercial-scale reactions (e.g., commercial-scale, gas-phase fluidized-bed polymerization reactions) that can be controlled in accordance with the invention. Some such reactions can occur in a reactor having the geometry of reactor 10 of FIG. 1; others can occur in other reactors. In different embodiments of the invention, transitions in polymerization reactions performed in any of a variety of different reactors are controlled in accordance with the invention.

In some embodiments, a continuous gas phase fluidized bed reactor is controlled in accordance with the invention while it operates to perform polymerization as follows. The fluidized bed is made up of polymer granules. Gaseous feed streams of the primary monomer and hydrogen together with liquid or gaseous comonomer are mixed together in a mixing tee arrangement and introduced below the reactor bed into the recycle gas line. For example, the primary monomer is ethylene and the comonomer is hexene. The individual flow rates of ethylene, hydrogen and comonomer are controlled to maintain fixed composition targets. The ethylene concentration is controlled to maintain a constant ethylene partial pressure. The hydrogen is controlled to maintain a constant hydrogen to ethylene mole ratio. The hexene is controlled to maintain a constant hexene to ethylene mole ratio. The concentration of all gases is measured by an on-line gas chromatograph to ensure relatively constant composition in the recycle gas stream. A solid or liquid catalyst is injected directly into the fluidized bed using purified nitrogen as a carrier. Its rate is adjusted to maintain a constant production rate. The reacting bed of growing polymer particles is maintained in a fluidized state by the continuous flow of the make up feed and recycle gas through the reaction zone. In some implementations, a superficial gas velocity of 1-3 ft/sec is used to achieve this, and the reactor is operated at a total pressure of 300 psig. To maintain a constant reactor temperature, the temperature of the recycle gas is continuously adjusted up or down to accommodate any changes in the rate of heat generation due to the polymerization. The fluidized bed is maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small steam of humidified nitrogen to deactivate any trace quantities of residual catalyst.

In other embodiments, a reactor is controlled in accordance with the invention while it operates to perform polymerization using any of a variety of different processes (e.g., solution, slurry, or gas phase processes). For example, the reactor can be a fluidized bed reactor operating to produce polyolefin polymers by a gas phase polymerization process. This type of reactor and means for operating such a reactor are well known. In operation of such reactors to perform gas phase polymerization processes, the polymerization medium can be mechanically agitated or fluidized by the continuous flow of the gaseous monomer and diluent.

In some embodiments, a polymerization reaction is controlled in accordance with the invention. The reaction can be a continuous gas phase process (e.g., a fluid bed process). A fluidized bed reactor for performing such a process typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. This method of operation is referred to as "condensed mode". A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

The reactor temperature of the fluid bed process can range from 30° C. or 40° C. or 50° C. to 90° C. or 100° C. or 110° C. or 120° C. or 150° C. In general, the reactor temperature is operated at the highest temperature that is feasible taking into account the sintering temperature of the polymer product within the reactor. The polymerization temperature, or reaction temperature typically must be below the melting or "sintering" temperature of the polymer to be formed. Thus, the upper temperature limit in one embodiment is the melting temperature of the polyolefin produced in the reactor.

In other embodiments, a reactor whose operation is controlled in accordance with the invention effects polymerization by a slurry polymerization process. A slurry polymerization process generally uses pressures in the range of from 1 to 50 atmospheres and even greater and temperatures in the range of 0° C. to 120° C., and more particularly from 30° C. to 100° C. In a slurry polymerization, a suspension of solid, particulate polymer is formed in a liquid polymerization diluent medium to which monomer and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

In other embodiments, a reaction controlled in accordance with the invention is or includes particle form polymerization, or a slurry process in which the temperature is kept below the temperature at which the polymer goes into solution. In other embodiments, a reaction controlled in accordance with the invention is a loop reactor or one of a plurality of stirred reactors in series, parallel, or combinations thereof. Non-limiting examples of slurry processes include continuous loop or stirred tank processes.

A reaction controlled in accordance with some embodiments of the invention can produce homopolymers of olefins, e.g., ethylene, and/or copolymers, terpolymers, and the like, of olefins, particularly ethylene, and at least one other olefin. The olefins, for example, may contain from 2 to 16 carbon atoms in one embodiment; and in another embodiment, ethylene and a comonomer comprising from 3 to 12 carbon atoms in another embodiment; and ethylene and a comonomer comprising from 4 to 10 carbon atoms in yet another embodiment; and ethylene and a comonomer comprising from 4 to 8 carbon atoms in yet another embodiment. A reaction controlled in accordance with the invention can produce polyethylenes. Such polyethylenes can be homopolymers of ethylene and interpolymers of ethylene and at least one α-olefin wherein the ethylene content is at least about 50% by weight of the total monomers involved. Exemplary olefins that may be utilized in embodiments of the invention are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbomene and 5-vinyl-2-norbomene, and olefins formed in situ in the polymerization medium. When olefins are formed in situ in the polymerization medium, the formation of polyolefins containing long chain branching may occur.

In the production of polyethylene or polypropylene, comonomers may be present in the polymerization reactor. When present, the comonomer may be present at any level with the ethylene or propylene monomer that will achieve the desired weight percent incorporation of the comonomer into the finished resin.

Hydrogen gas is often used in olefin polymerization to control the final properties of the polyolefin. For some types of catalyst systems, it is known that increasing concentrations (partial pressures) of hydrogen increase the melt flow (MF) and/or melt index (MI) of the polyolefin generated. The MF or MI can thus be influenced by the hydrogen concentration. The amount of hydrogen in the polymerization can be expressed as a mole ratio relative to the total polymerizable monomer, for example, ethylene, or a blend of ethylene and hexane or propene. The amount of hydrogen used in some polymerization processes is an amount necessary to achieve the desired MF or MI of the final polyolefin resin. In one embodiment, the mole ratio of hydrogen to total monomer ($H_2$:monomer) is greater than 0.00001. The mole ratio is greater than 0.0005 in another embodiment, greater than 0.001 in yet another embodiment, less than 10 in yet another embodiment, less than 5 in yet another embodiment, less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 10 ppm in one embodiment, or up to 100 or 3000 or 4000 or 5000 ppm in other embodiments, or between 10 ppm and 5000 ppm in yet another embodiment, or between 500 ppm and 2000 ppm in another embodiment.

A reactor controlled in accordance with some embodiments of the invention can be an element of a staged reactor employing two or more reactors in series, wherein one reactor may produce, for example, a high molecular weight component and another reactor may produce a low molecular weight component.

A reactor controlled in accordance with the invention can implement a slurry or gas phase process in the presence of a bulky ligand metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc and the like. By "essentially free", it is meant that these compounds are not deliberately added to the reactor or any reactor components, and if present, are present to less than 1 ppm in the reactor.

A reactor controlled in accordance with the invention can employ one or more catalysts combined with up to 10 wt % of a metal-fatty acid compound, such as, for example, an aluminum stearate, based upon the weight of the catalyst system (or its components). Other metals that may be suitable include other Group 2 and Group 5-13 metals. In other embodiments, a solution of the metal-fatty acid compound is fed into the reactor. In other embodiments, the metal-fatty acid compound is mixed with the catalyst and fed into the reactor separately. These agents may be mixed with the catalyst or may be fed into the reactor in a solution or a slurry with or without the catalyst system or its components.

In a reactor controlled in accordance with some embodiments of the invention, supported catalyst(s) can be combined with activators and can be combined by tumbling and/or other suitable means, with up to 2.5 wt % (by weight of the catalyst composition) of an antistatic agent, such as an ethoxylated or methoxylated amine, an example of which is Kemamine AS-990 (ICI Specialties, Bloomington Del.). Other antistatic compositions include the Octastat family of compounds, more specifically Octastat 2000, 3000, and 5000.

Metal fatty acids and antistatic agents can be added as either solid slurries or solutions as separate feeds into the reactor. One advantage of this method of addition is that it permits on-line adjustment of the level of the additive.

Examples of polymers that can be produced in accordance with the invention include the following: homopolymers and copolymers of $C_2$-$C_{18}$ alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; and polychloroprene; norbornene homopolymers and copolymers with one or more $C_2$-$C_{18}$ alpha olefin; terpolymers of one or more $C_2$-$C_{18}$ alpha olefins with a diene.

Monomers that can be present in a reactor controlled in accordance with the invention include one or more of: $C_2$-$C_{18}$ alpha olefins such as ethylene, propylene, and optionally at least one diene, for example, hexadiene, dicyclopentadiene, octadiene including methyloctadiene (e.g., 1-methyl-1,6-octadiene and 7-methyl-1,6-octadiene), norbornadiene, and ethylidene norbornene; and readily condensable monomers, for example, isoprene, styrene, butadiene, isobutylene, chloroprene, acrylonitrile, cyclic olefins such as norbornenes.

Fluidized bed polymerization (e.g., mechanically stirred and/or gas fluidized) reactions can be controlled in accordance with some embodiments of the invention. The reaction can be any type of fluidized polymerization reaction and can be carried out in a single reactor or multiple reactors such as two or more reactors in series.

In various embodiments, any of many different types of polymerization catalysts can be used in a polymerization process controlled in accordance with the present invention. A single catalyst may be used, or a mixture of catalysts may be employed, if desired. The catalyst can be soluble or insoluble, supported or unsupported. It may be a prepolymer, spray dried with or without a filler, a liquid, or a solution, slurry/suspension or dispersion. These catalysts are used with cocatalysts and promoters well known in the art. Typically these are alkylaluminums, alkylaluminum halides, alkylaluminum hydrides, as well as aluminoxanes. For illustrative purposes only, examples of suitable catalysts include Ziegler-Natta catalysts, chromium, chromium oxide, $AlCl_3$, iron, palladium, or vanadium based catalysts (e.g., vanadium oxychloride and vanadium acetylacetonate), metallocene catalysts (e.g., hafnium metallocene catalysts, including any of those described in U.S. Pat. No. 6,242,545, U.S. Pat. No. 6,528,597, or U.S. Patent Application Publication No. US 2005/0282980 A1) and other single-site or single-site-like catalysts, Cationic forms of metal halides (e.g., aluminum trihalides), anionic initiators (e.g., butyl lithiums), Cobalt catalysts and mixtures thereof, Nickel catalysts and mixtures thereof, and rare earth metal catalysts (i.e., those containing a metal having an atomic number in the Periodic Table of 57 to 103), such as compounds of cerium, lanthanum, praseodymium, gadolinium and neodymium.

In various embodiments, a polymerization reaction controlled in accordance with the invention can employ other additives, such as (for example) inert particulate particles.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method for controlling a transition from an initial polymerization reaction to a target polymerization reaction in a fluidized bed reactor, where the initial polymerization reaction is to produce polymer product with properties that meet a first specification set, the target polymerization reaction is to produce polymer product with properties that meet a second specification set including a target density range for the product, and a concentration ratio and a feed ratio for the transition are controllable, said method including the steps of:
   (a) during the transition, maintaining a first one of the concentration ratio and the feed ratio at an at least substantially constant value while implementing process changes in an effort to bring produced polymer into compliance with the second specification set and monitoring without controlling the other one of the concentration ratio and the feed ratio to generate first data; and
   (b) during the transition, determining from the first data whether polymer having excessively low density is likely to be produced during the transition, and upon determining from the first data that polymer having excessively low density is likely to be produced during the transition, maintaining during the remaining portion of the transition said other one of the concentration ratio and the feed ratio at a value that is at least substantially constant while allowing the first one of the concentration ratio and the feed ratio to vary.

2. The method of claim 1, wherein the polymer product is polyethylene, the concentration ratio is a ratio of comonomer to ethylene concentration in the reactor, and the feed ratio is a ratio of comonomer feed rate to ethylene feed rate into the reactor.

3. The method of claim 2, wherein the concentration ratio is a ratio of hexene to ethylene concentration in the reactor, and the feed ratio is a ratio of hexene feed rate to ethylene feed rate into the reactor.

4. The method of claim 1, wherein each of the initial polymerization reaction and the target polymerization reaction polymerizes ethylene and at least one comonomer in the presence of a catalyst selected from a group consisting of Ziegler-Natta, chromium, chromium oxide, $AlCl_3$, cobalt, iron, palladium, and metallocene catalyst.

5. The method of claim 2, wherein the comonomer is a $C_3$-$C_{10}$ alpha olefin.

6. The method of claim 1, wherein the polymer product is polyethylene, each of the initial polymerization reaction, the transition, and the target polymerization reaction is performed in a gas phase fluidized bed reactor, the concentration ratio is a ratio of comonomer to ethylene concentration in the gas phase fluidized bed reactor, and the feed ratio is a ratio of comonomer feed rate to ethylene feed rate into the gas phase fluidized bed reactor.

7. The method of claim 1, wherein during step (a) and commencing at the start of the transition, the first one of the concentration ratio and the feed ratio is maintained at the at least substantially constant value.

8. The method of claim 1, wherein during step (a), the first one of the concentration ratio and the feed ratio is maintained at the at least substantially constant value during an initial interval of the transition while the other one of the concentration ratio and the feed ratio is allowed to vary, and said first one of the concentration ratio and the feed ratio is maintained at another at least substantially constant value during a subsequent interval of the transition while said other one of the concentration ratio and the feed ratio is allowed to vary.

9. The method of claim 1, wherein step (b) includes the step of determining from the first data that polymer having excessively low density is likely to be produced during the transition by determining that said other one of the concentration ratio and the feed ratio has increased to a predetermined threshold value.

10. The method of claim 1, wherein at least one of reactor temperature and monomer concentration in the reactor changes during the transition.

11. The method of claim 1, wherein concentration of at least one of a continuity agent and hydrogen in the reactor changes during the transition.

12. The method of claim 1, wherein concentration of at least one of isopentane and hydrogen in the reactor changes during the transition.

* * * * *